United States Patent
Yarmohamadi et al.

(10) Patent No.: US 11,753,014 B2
(45) Date of Patent: Sep. 12, 2023

(54) METHOD AND CONTROL UNIT AUTOMATICALLY CONTROLLING LANE CHANGE ASSIST

(71) Applicant: Zenuity AB, Gothenburg (SE)

(72) Inventors: Hoda Yarmohamadi, Gothenburg (SE); Runar Frimannsson, Nödinge (SE); Foad Mohammadi, Gothenburg (SE); Fredrik Strannerdahl, Ljungskile (SE); Vishnu Muraleedharan, Gothenburg (SE)

(73) Assignee: Zenuity AB, Gothenburg (SE)

( * ) Notice: Subject to any disclaimer, the term of this patent is extended or adjusted under 35 U.S.C. 154(b) by 140 days.

(21) Appl. No.: 17/149,807

(22) Filed: Jan. 15, 2021

(65) Prior Publication Data
US 2021/0213953 A1    Jul. 15, 2021

(30) Foreign Application Priority Data
Jan. 15, 2020 (EP) .................................... 20151933

(51) Int. Cl.
B60W 30/18 (2012.01)
(52) U.S. Cl.
CPC ... B60W 30/18163 (2013.01); *B60W 2552/05* (2020.02); *B60W 2552/50* (2020.02);
(Continued)
(58) Field of Classification Search
CPC ....... B60W 30/18163; B60W 2552/05; B60W 2552/50; B60W 2554/4041;
(Continued)

(56) References Cited

U.S. PATENT DOCUMENTS

2015/0166070 A1* 6/2015 Hoerwick ............. B60W 40/06
701/532
2020/0247415 A1* 8/2020 Tsuji .................. G01C 21/3492

FOREIGN PATENT DOCUMENTS

DE    102018203744 A1 *  9/2019
DE    102018203744 A1    9/2019
(Continued)

OTHER PUBLICATIONS

Kim Jun Sun, Apr. 11, 2018, English Machine Translation_KR20190119502A provided by Patent Translate by EPO and Google (Year: 2018).*
(Continued)

*Primary Examiner* — Peter D Nolan
*Assistant Examiner* — Ashley L Redhead, Jr.
(74) *Attorney, Agent, or Firm* — SAGE PATENT GROUP

(57) ABSTRACT

Provided are a control unit and a method in a control unit to automatically control a lane change assist function in a vehicle. Multiple conditions indicating that a lane change assist function are activated at a current position of the vehicle are evaluated in the control unit. The conditions are selected from sensor based conditions, historical based conditions, and map based conditions. Sensor based conditions are conditions based on sensor. Historical based conditions are conditions based on historical data received. Map based conditions are conditions based on digital map data. If conditions from at least two different groups of conditions are evaluated as met, a digital signal is provided in the control unit enabling activation of the lane change assist function in the vehicle.

11 Claims, 4 Drawing Sheets

(52) U.S. Cl.
CPC . *B60W 2554/4041* (2020.02); *B60W 2555/60* (2020.02); *B60W 2556/10* (2020.02)

(58) Field of Classification Search
CPC ......... B60W 2555/60; B60W 2556/10; B60W 2050/0075; B60W 50/14; B60W 60/0059; B60W 2552/10; B60W 2556/40; B60W 2556/55; B60W 40/02; B60W 2552/53
See application file for complete search history.

(56) References Cited

FOREIGN PATENT DOCUMENTS

| KR | 20190119502 A | * | 4/2018 |
| KR | 20190119502 A | | 10/2019 |

OTHER PUBLICATIONS

August Alexander, Sep. 19, 2019, English Machine Translation_DE-102018203744-A1 provided by Patent Translate by EPO and Google (Year: 2019).*
Extended European Search Report dated Aug. 14, 2020 for European Patent Application No. 20151933.7, 8 pages.

* cited by examiner

METHOD AND CONTROL UNIT AUTOMATICALLY CONTROLLING LANE CHANGE ASSIST

CROSS-REFERENCE TO RELATED APPLICATIONS

The present application for patent claims priority to European Patent Office Application Ser. No. 20151933.7, entitled "METHOD AND CONTROL UNIT AUTOMATICALLY CONTROLLING LANE CHANGE ASSIST" filed on Jan. 15, 2020, assigned to the assignee hereof, and expressly incorporated herein by reference.

TECHNICAL FIELD OF THE INVENTION

The present invention relates to a control unit and method in a control unit for automatically controlling a lane change assist function in a vehicle.

BACKGROUND

Today, many vehicles have a variety of driver support functions in the form of advanced driver assistance systems (ADAS) features. Also, many of these features form a basis for current and future autonomous drive (AD) features. Examples of ADAS features include lane departure warning systems, lane centering, lane keeping aid, pilot assist, lane change assistance, parking sensors, pedestrian protection systems, blind spot monitors, adaptive cruise control (ACC), anti-lock braking systems, and so forth. These features supplement the traditional driver control of the vehicle with one or more warnings or automated actions in response to certain scenarios.

ADAS or AD systems or one or more specific features, such as a lane change assist function, of such systems can be restricted for use only on certain road types and/or in certain situations, e.g. on a highway, motorway or freeway, depending for example on a complexity of the traffic situation and/or risk of severe accidents associated with the road type and/or the particular situation. Hence, before activation of the lane change assist function, it has to be determined that the vehicle is currently travelling on a road of a required type where use of the lane change assist function may be activated and if the current situation allows it. Furthermore, once activated, it has to be continuously determined whether the lane change assist function may remain activated. Drawbacks remain with the presently known methods and systems.

SUMMARY OF THE INVENTION

An object of the present disclosure is to provide a method, a non-transitory computer-readable storage medium, a control unit and a vehicle, which seek to mitigate, alleviate, or eliminate one or more of drawbacks of presently known systems and methods.

This object is achieved by a method in a control unit, a non-transitory computer-readable storage medium, a control unit and a vehicle as defined in the appended claims. The term exemplary is in the present context to be understood as an instance, example or illustration.

According to a first aspect of the present disclosure, there is provided a method in a control unit for automatically controlling a lane change assist function in a vehicle. A plurality of conditions indicating that a lane change assist function may be activated at a current position of the vehicle are evaluated in the control unit. The plurality of conditions comprises conditions selected from groups of sensor based conditions, historical based conditions, and map based conditions. The sensor based conditions are conditions based on sensor data received in the control unit in a first digital signal from one or more sensors of the vehicle and being related to the current position of the vehicle. The historical based conditions are conditions based on historical data received in the control unit in a second digital signal from memory and being related to the current position of the vehicle. The map based conditions are conditions based on digital map data received in the control unit in a third digital signal from memory and being related to the current position of the vehicle. In the control unit, a fourth digital signal enabling activation of the lane change assist function in the vehicle at the current position of the vehicle is provided if conditions from at least two different groups of conditions are evaluated as met.

By means of the proposed method, a simple and reliable way of determining that a lane change assist function in the vehicle may be activated at the current position of the vehicle is achieved and activation of the lane change assist function can be accordingly enabled.

A vehicle in the present context may be any type of road vehicle, such as e.g. a car, a bus, a truck, etc.

According to an exemplary embodiment of the present disclosure, the method of the first aspect further comprises providing, in the control unit, a fifth digital signal enabling activation of the lane change assist function in the vehicle at the current position of the vehicle if at least two conditions from the group of sensor based conditions are evaluated as met, wherein the at least two conditions are based on mutually different algorithms.

According to a further exemplary embodiment of the present disclosure, the method of the first aspect further comprises providing, in the control unit, a sixth digital signal disabling activation of the lane change assist function in the vehicle at the current position of the vehicle for all other cases.

According to a further exemplary embodiment of the present disclosure, the plurality of conditions are one or more of:
the historical data received in the control unit in the second digital signal from memory indicate that the lane change assist function may be activated at the current position of the vehicle,
the digital map data received in the control unit in the third digital signal from memory indicate that that the current position of the vehicle corresponds to a road type on which the lane change assist function may be activated,
the sensor data received in the control unit in the first digital signal from the one or more sensors indicate detection of two lanes in a direction the vehicle is travelling and a non-traversable separator to oncoming traffic in relation to the current position of the vehicle, and
the sensor data received in the control unit in the first digital signal from the one or more sensors indicate detection of a road sign in relation to the current position of the vehicle, which road sign indicates a road type on which the lane change assist function may be activated.

According to a further exemplary embodiment of the present disclosure, the road type indicated by the digital map data is a highway.

According to a further exemplary embodiment of the present disclosure, the detected road sign indicates a highway or a speed limit over a first threshold.

According to a further exemplary embodiment of the present disclosure, the one or more sensors are one or more cameras, ultrasonic sensors, LIDAR sensors or radar sensors.

According to a further exemplary embodiment of the present disclosure, the method of the first aspect further comprises evaluating, in the control unit, one or more further conditions indicating that a lane change assist function may not be activated at the current position of the vehicle, and providing, in the control unit, an seventh digital signal disabling activation of the lane change assist function in the vehicle at the current position of the vehicle if at least one of the one or more further conditions of the further plurality of conditions is met.

According to a further exemplary embodiment of the present disclosure, the one or more further conditions are selected from the following conditions:
- the sensor data received in the control unit in the first digital signal from the one or more sensors indicate no detection of a non-traversable separator between the vehicle and oncoming traffic,
- the sensor data received in the control unit in the first digital signal from the one or more sensors indicate detection of speed limit sign with speed limit under a second threshold,
- the sensor data received in the control unit in the first digital signal from the one or more sensors indicate detection of tunnel,
- the sensor data received in the control unit in the first digital signal from the one or more sensors indicate detection of toll booth,
- the sensor data received in the control unit in the first digital signal from the one or more sensors indicate detection of construction site, and
- the sensor data received in the control unit in the first digital signal from the one or more sensors indicate detection of highway end sign.

According to a further exemplary embodiment of the present disclosure, the further condition that the sensor data indicates no detection of a non-traversable separator between the vehicle and oncoming traffic, is evaluated by determining in the control unit, by means of sensor data from the one or more sensors of the vehicle, lateral coordinates of non-traversable road edges on the right side and the left side of the vehicle, determining in the control unit, by means of sensor data from the one or more sensors of the vehicle, lateral coordinate of an oncoming vehicle, and determining, in the control unit, that the further condition that the sensor data indicates no detection of a non-traversable separator between the vehicle and oncoming traffic is met if the lateral coordinate of the oncoming vehicle is within the lateral coordinates of the non-traversable road edges on the right side and the left side of the vehicle.

According to a second aspect of the present disclosure, there is provided a non-transitory computer-readable storage medium storing one or more programs configured to be executed by one or more processors of a control unit, the one or more programs comprising instructions for causing the control unit to perform the method of the first aspect. With this aspect of the disclosure, similar advantages and preferred features are present as in the previously discussed first aspect of the disclosure.

Embodiments of the non-transitory computer-readable storage medium according to the second aspect may for example include features corresponding to the features of any of the embodiments of the method according to the first aspect.

According to a third aspect of the present disclosure, there is provided a control unit comprising at least one processor and at least one memory. The at least one processor is configured to execute instructions stored in the memory causing the control unit to automatically controlling a lane change assist function in a vehicle. In the control unit, a plurality of conditions indicating that a lane change assist function may be activated at a current position of the vehicle are evaluated. The plurality of conditions comprises conditions selected from groups of sensor based conditions, historical based conditions, and map based conditions. The sensor based conditions are conditions based on sensor data received in the control unit in a first digital signal from one or more sensors of the vehicle and being related to the current position of the vehicle. The historical based conditions are conditions based on historical data received in the control unit in a second digital signal from memory and being related to the current position of the vehicle. The map based conditions are conditions based on digital map data received in the control unit in a third digital signal from memory and being related to the current position of the vehicle. In the control unit, a fourth digital signal enabling activation of the lane change assist function in the vehicle at the current position of the vehicle is provided if conditions from at least two different groups of conditions are evaluated as met.

Embodiments of the control unit according to the third aspect may for example include features corresponding to the features of any of the embodiments of the method according to the first aspect.

According to a fourth aspect of the present disclosure, there is provided a vehicle comprising the control unit of the third aspect. Embodiments of the vehicle according to the fourth aspect may for example include features corresponding to the features of any of the embodiments of the control unit according to the third aspect.

It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which.

DETAILED DESCRIPTION

Figure 1A:
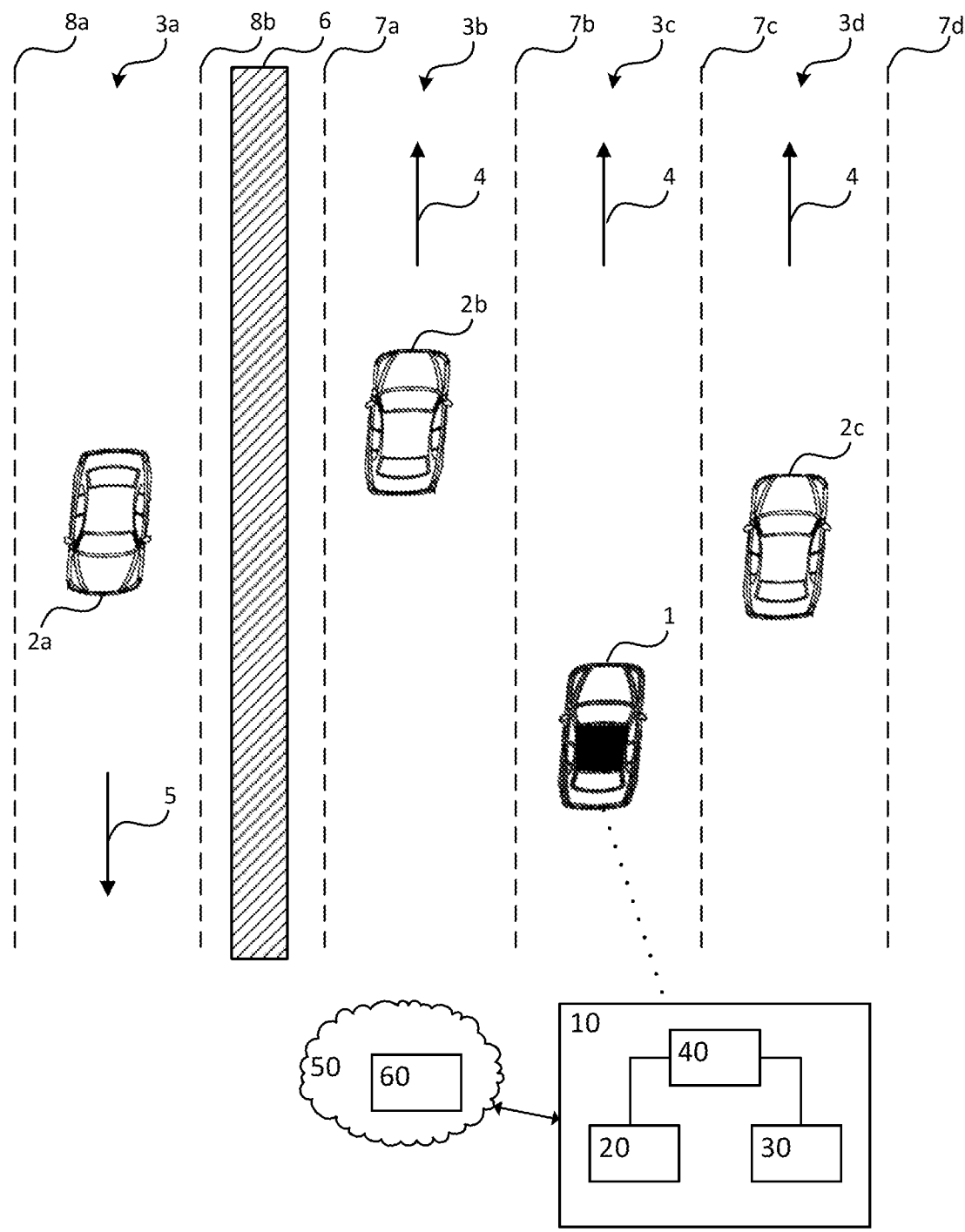
FIGS. 1a and 1b are schematic top view illustration of a vehicle and surrounding vehicles in relation to embodiments of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Figure 1B:
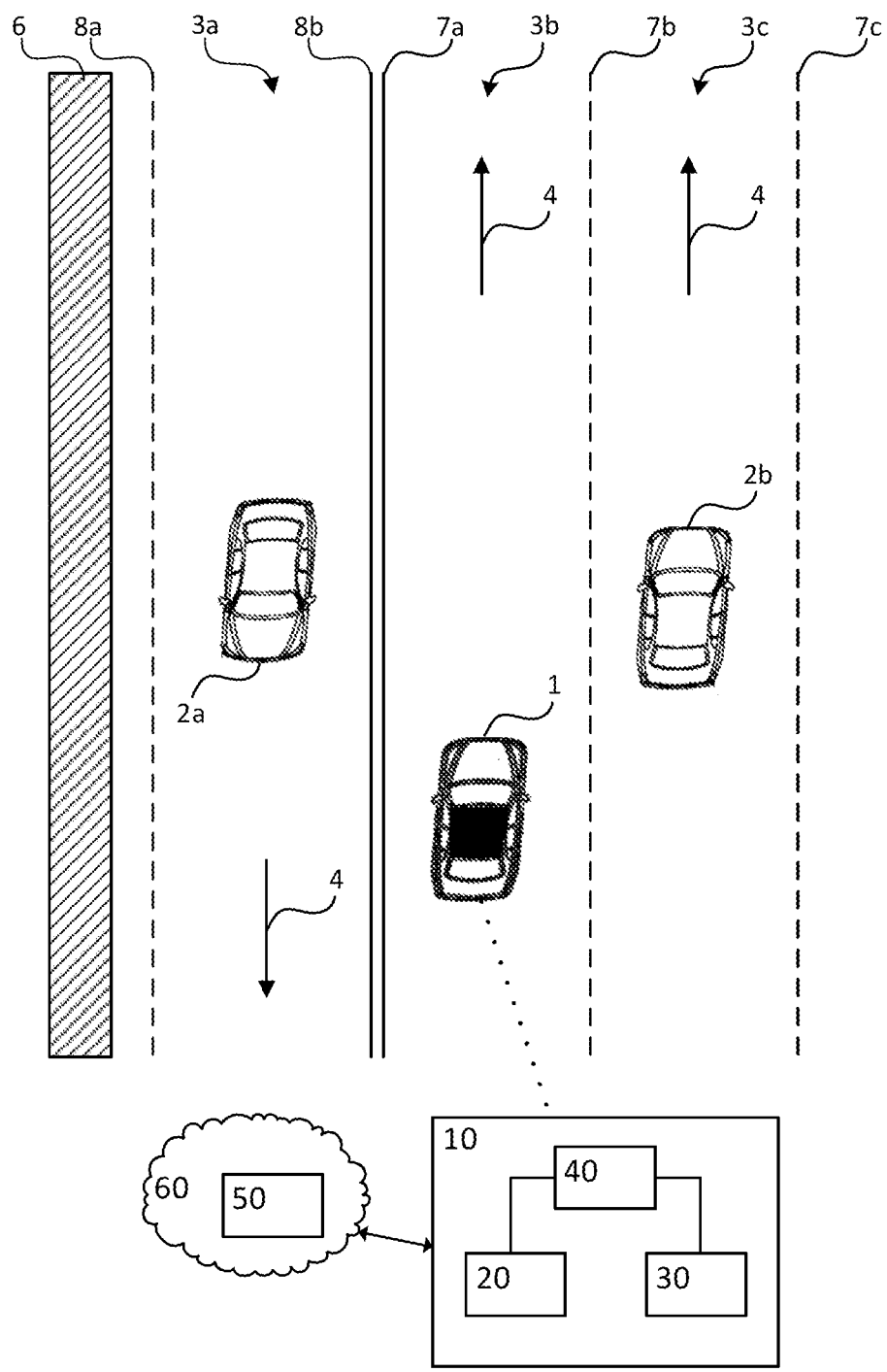
Figure 2:
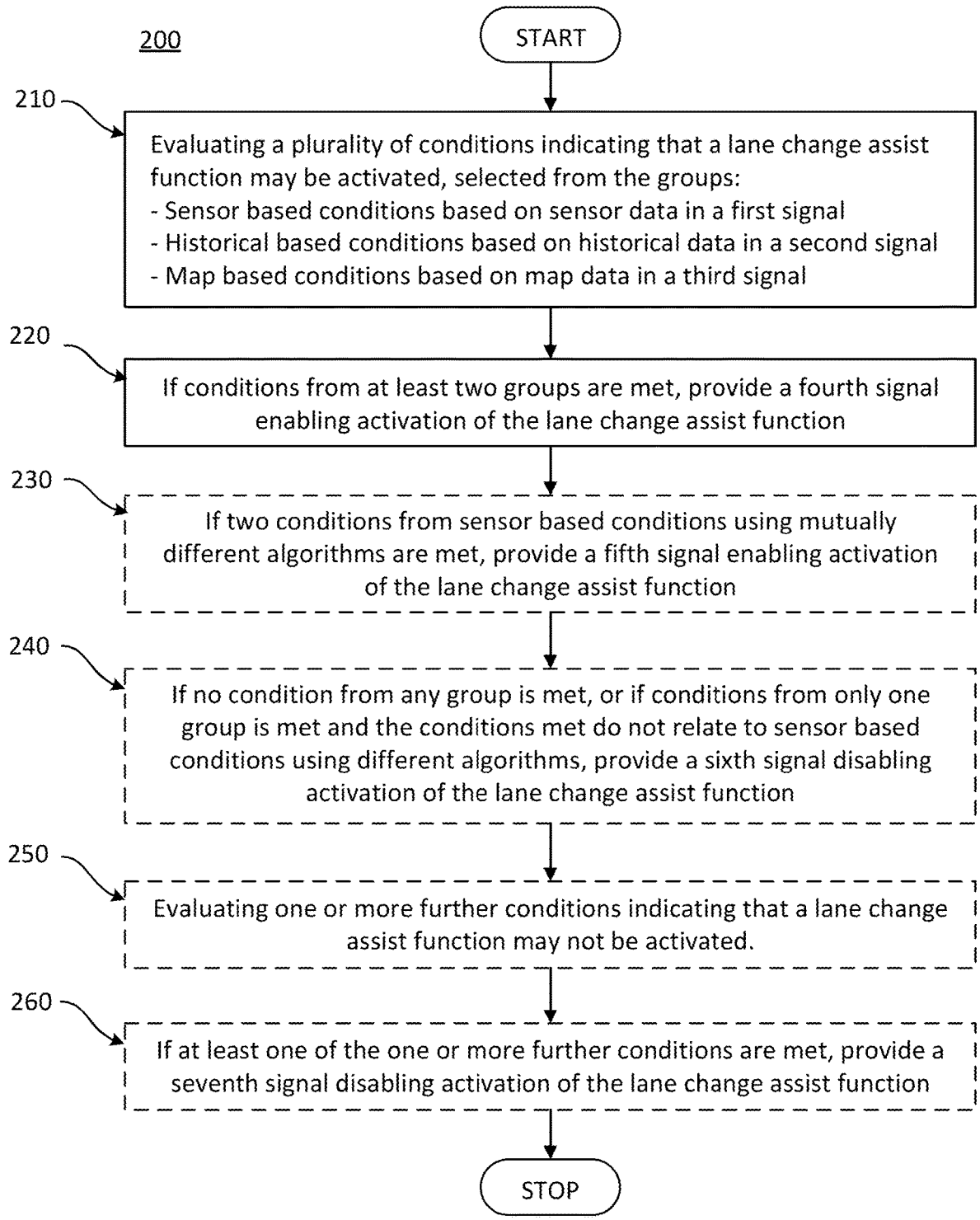
FIG. 2 is a flow-chart representation of a method in a control unit for automatically controlling a lane change assist function in a vehicle in accordance with an embodiment of the present disclosure.
Figure 3:
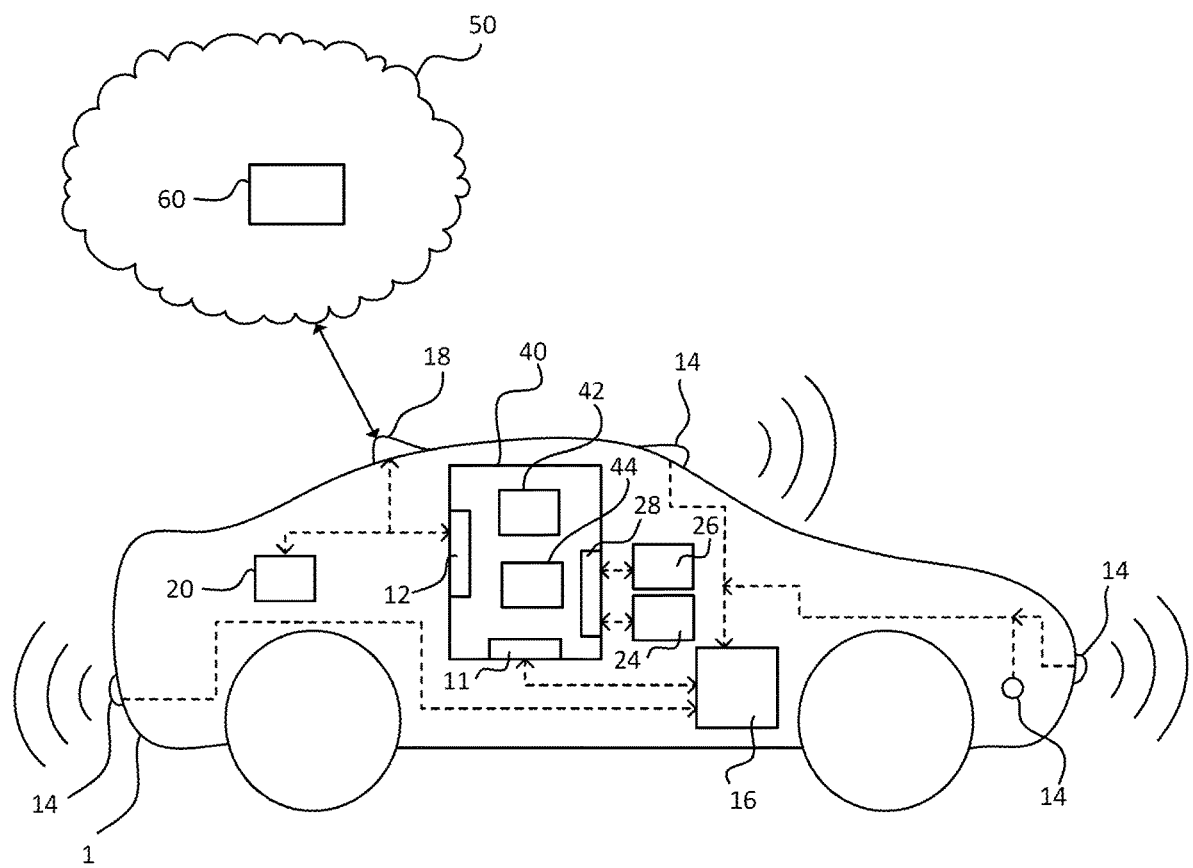
FIG. 3 is a schematic side view illustration of a vehicle comprising a control unit in accordance with an embodiment of the present disclosure.
Figure 4:
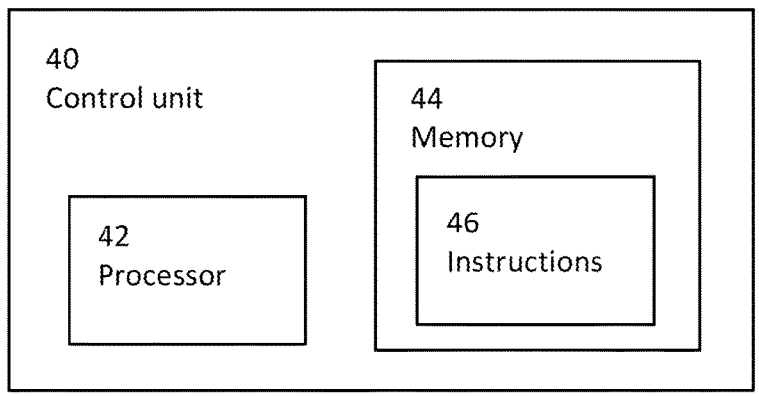
FIG. 4 is a schematic diagram of a control unit in accordance with an embodiment of the present disclosure.

FIG. 1a and FIG. 1b show schematic top-view illustrations of a vehicle 1 in relation to embodiments of the present disclosure, e.g. as discussed in relation to FIGS. 2-4. The vehicle 1 is referred to as ego vehicle 1 in the following.

The schematic illustration in FIG. 1a shows the ego vehicle 1 and three further vehicles 2a, 2b, 2c on a road with four separate lanes 3a, 3b, 3c, 3d. Three lanes 3b, 3c, 3d of the four separate lanes 3a, 3b, 3c, 3d are for traffic in a first direction 4, and one lane 3a is for traffic in a second direction 5 opposite to the first direction 4. The ego vehicle 1 is located in a middle lane 3c intended for traffic in the first direction 4. One vehicle 2a of the three further vehicles 2a, 2b, 2c is traveling in the opposite direction 5 of the ego vehicle 1 and is referred to as an oncoming vehicle 2a in the following. The oncoming vehicle 2a is located in an opposing lane 3a for traffic in the second direction 5. Two other vehicles 2b, 2c of the further vehicles 2a, 2b, 2c are traveling in the same direction 4 as the ego vehicle 1. A first other vehicle 2b traveling in the same direction 4 as the ego vehicle 1, is located in a leftmost lane 3b of the lanes intended for traffic in the first direction 4. A second other vehicle 2c traveling in the same direction 4 as the ego vehicle 1, is located in a rightmost lane 3d of the lanes intended for traffic in the first direction 4. Between the leftmost lane 3b and the oncoming lane 3a, there is a non-traversable separator 6, which is intended to prevent vehicles to traverse from between lanes intended for traffic in different directions 4, 5. The non-traversable separator 6 may for example be made of concrete, posts with steel wires etc.

Each of the three lanes 3b, 3c, 3d for traffic in the first direction 4 are defined by four lane markings 7a, 7b, 7c, 7d, and the opposing lane 3a is defined by two lane markings 8a, 8b.

The schematic illustration in FIG. 1b shows the ego vehicle 1 and two further vehicles 2a, 2b on a road with three separate lanes 3a, 3b, 3c. Two lanes 3b, 3c of the three separate lanes 3a, 3b, 3c are for traffic in the first direction 4, and one lane 3a is for traffic in the second direction 5 opposite to the first direction 4. The ego vehicle 1 is located in a leftmost lane 3b intended for traffic in the first direction 4. One vehicle 2a of the three further vehicles 2a, 2b is traveling in the opposite direction 5 of the ego vehicle 1 and is referred to as an oncoming vehicle 2a in the following. The oncoming vehicle 2a is located in an opposing lane 3a for traffic in the second direction 5. An other vehicle 2b of the further vehicles 2a, 2b is traveling in the same direction 4 as the ego vehicle 1. The other vehicle 2b traveling in the same direction 4 as the ego vehicle 1, is located in a rightmost lane 3c of the lanes intended for traffic in the first direction 4. Between the leftmost lane 3b and the oncoming lane 3a, there is no physical separator but only specific lane markings 7b, 8b indicating that vehicles are not allowed to traverse between lanes intended for traffic in different directions 4, 5. A non-traversable separator 6 is indicated also in FIG. 1b but not between lanes of different directions 4, 5 but to the left of all lanes 3a, 3b, 3c.

Each of the two lanes 3b, 3c for traffic in the first direction 4 are defined three lane markings 7a, 7b, 7c, and the opposing lane 3a is defined by two lane markings 8a, 8b.

In both FIG. 1a and FIG. 1b, the ego vehicle 1 comprises a vehicle system 10. The vehicle system 10 comprises a localization system 20 configured to determine a current set of geographical coordinates (i.e. a current map position) of the ego vehicle 1. The vehicle system 10 further includes a sensor system 30 comprising at least one sensor (not shown) for detecting and identifying objects that are external to the ego vehicle 1, such as other vehicles, traffic signs, lane markings, etc. The sensor system 30 may for example comprise one or more of a radar arrangement, LIDAR arrangement, ultrasonic arrangement, one or more cameras, and any other suitable sensors.

Furthermore, the vehicle system 10 has a control unit 40 connected to the localization system 20 and the sensor system 30. The vehicle system 10 may further be connected to an external network 50 comprising a remote system 60. The remote system 60 may for example be a cloud based system. The remote system 60 may for example provide, to the ego vehicle 1, map data and historical data in relation to a current position of the ego vehicle 1.

The control unit 40 is configured to receive data the remote system 60, memory (not shown) in the ego vehicle 1, and the sensor system 30, and evaluate conditions defined in relation to the sources of data. Depending on the outcome of the evaluation, the control unit 40 may provide a digital signal enabling activation of a lane change assist function in the ego vehicle 1 at the current position of the ego vehicle 1. In alternative, the control unit 40 may provide another digital signal disabling activation of the lane change assist function in the ego vehicle 1 at the current position of the ego vehicle 1.

FIG. 2 is a flow-chart representation of a method in a control unit for automatically controlling a lane change assist function in a vehicle (ego vehicle in the following) in accordance with an embodiment of the present disclosure.

In the method, a plurality of conditions indicating that a lane change assist function may be activated at a current position of the ego vehicle are evaluated 210. The plurality of conditions comprises conditions selected from the following groups:

sensor based conditions,
historical based conditions, and
map based conditions.

The sensor based conditions are conditions based on sensor data received in the control unit in a first digital signal from one or more sensors of the ego vehicle and being related to the current position of the ego vehicle.

The historical based conditions are conditions based on historical data received in the control unit in a second digital signal from memory and being related to the current position of the ego vehicle.

The map based conditions are conditions based on digital map data received in the control unit in a third digital signal from memory and being related to the current position of the ego vehicle.

If the evaluation shows that conditions from at least two different groups of conditions are met, the control unit provides 220 a fourth digital signal that enables activation of the lane change assist function in the ego vehicle at the current position of the ego vehicle.

The different groups are divided to include conditions based on different types of data, namely sensor data from a sensor system of the ego vehicle, historical data e.g. from memory in the ego vehicle or from memory in a remote system, and map data e.g. from memory in the ego vehicle or from memory in a remote system. The different groups thus inherently rely on mutually different sources and/or algorithms for deriving the data. Hence, if conditions in two different groups are met, this will mean that conditions based on different types of data indicate that a lane change assist function may be activated. This enables an effective way of introducing increased reliability in relation to prior art where it is not as straightforward to identify sources and/or algorithms used of deriving data.

The one or more sensors of the ego vehicle are typically one or more cameras, radar sensors, LIDAR sensors or ultrasonic sensors.

One or more cameras may be used to derive sensor data in the form of digital image data in which features of the surrounding environment of the ego vehicle can be identified. Such features may for example be lane markings, traffic signs, road separators/barriers and objects such as other vehicles travelling in the same direction as or opposite direction of the vehicle.

Furthermore, radar sensors, LIDAR sensors or ultrasonic sensors may be used to derive sensor data in the form of radar data, LIDAR data or ultrasonic data in which features of the surrounding environment of the ego vehicle can be identified. Such features may for example be other vehicles travelling in the same direction as or opposite direction of the ego vehicle, non-traversable separators, and other physical objects such as tunnels, toll booths, and construction sites.

The historical data and map data may be received from memory in the ego vehicle. In alternative, it may be received from a remote system 50 as disclosed and described in relation to FIG. 1a, FIG. 1b, and FIG. 3.

Additionally, if at least two conditions from the group of sensor based conditions are evaluated as met, wherein the at least two conditions are based on mutually different algorithms, the control unit provides 230 a fifth digital signal enabling activation of the lane change assist function in the ego vehicle at the current position of the ego vehicle.

Allowing the at least two conditions to be from the same group, namely the group of sensor based conditions, but requiring that the at least two conditions are based on mutually different algorithms, lowers the threshold for enabling activation of the lane change assist function of the ego vehicle but still maintains sufficient reliability since two mutually different algorithms need to fail simultaneously in order to provide an erroneous outcome of evaluation. This enables an effective way of introducing increased reliability in relation to prior art where it is not as straightforward to identify algorithms used of deriving data. Activation of the lane change assist function in the ego vehicle may be enabled in more situations whilst still ensuring reliability since the decision is made based on data derived using mutually different algorithms.

For all other cases, i.e. if no condition is met, if only one condition is met, or if two or more conditions from only one group is met where the two or more conditions met do not relate to sensor based conditions using mutually different algorithms, the control unit provides 240 a sixth signal disabling activation of the lane change assist function.

The plurality of conditions indicating that a lane change assist function may be activated at a current position of the ego vehicle, may be one or more of the following:

- the historical data received in the control unit in the second digital signal from memory indicate that the lane change assist function may be activated at the current position of the ego vehicle
- the digital map data received in the control unit in the third digital signal from memory indicate that that the current position of the ego vehicle corresponds to a road type (such as a highway) on which the lane change assist function may be activated.
- the sensor data received in the control unit in the first digital signal from the one or more sensors indicate detection of two lanes in a direction the ego vehicle is travelling and a non-traversable separator to oncoming traffic in relation to the current position of the ego vehicle, and
- the sensor data received in the control unit in the first digital signal from the one or more sensors indicate detection of a road sign (such as a road sign indicating a highway or a speed limit over a first threshold) in relation to the current position of the ego vehicle, which road sign indicates a road type (such as a highway) on which the lane change assist function may be activated.

The historical data may have been stored locally in memory in the ego vehicle or in a remote system, e.g. a cloud server. The historical data are then received in the control unit and from the historical data, the control unit can identify if the current position of the ego vehicle relates to a position, e.g. relating to a road of a particular road type, for which the historical data indicate that activation of the lane change assist function has been previously allowed.

Similarly, the map data may have been stored locally in memory in the ego vehicle or in a remote system, e.g. a cloud server. The map data are then received in the control unit and from the map data, the control unit can identify if the current position of the ego vehicle relates to a road type for which activation of the lane change assist function is allowed.

Turning back to FIG. 1a, the ego vehicle 1 receives sensor data, e.g. from one or more cameras and/or from one or more radar sensors. From the sensor data, the ego vehicle 1 identifies the lane markers 7a, 7b, 7c, 7d and the first other vehicle 2b and the second other vehicle 2c travelling in the leftmost lane 3b and the rightmost lane 3d, respectively. Based on this, the ego vehicle 1 establishes that there are at least two lanes in the same direction 4 as the ego vehicle 1 is traveling in. From the sensor data, the ego vehicle 1 further identifies the non-traversable separator 6 and its lateral position in relation to the ego vehicle 1, and the oncoming vehicle 2a and its lateral position in relation to the ego vehicle 1. Furthermore, it is required that it has already been established that there is no lane for oncoming traffic closer in lateral direction to the ego vehicle 1 than the opposing lane 3a in which the oncoming vehicle 2a is traveling. This may be established e.g. by identifying that the only lane between the middle lane 3c that the ego vehicle 1 is travelling and the opposing lane 3a, is for traffic in the same direction 4 as the ego vehicle 1 is travelling in. This may in turn be established by identifying the first other vehicle 2*b* from sensor data and that it is travelling in the same direction 4 as the ego vehicle 1. The non-traversable separator 6 is identified as being located between the ego vehicle 1 and any oncoming traffic. Hence, this indicates that activation of the lane change assist function may be activated.

Finally, the sensor data received in the control unit from the one or more sensors, e.g. one or more cameras, may indicate detection of a road sign, which road sign indicates a road type on which the lane change assist function may be activated. For example, the road sign may indicate that the ego vehicle is currently traveling on a highway. This may be identified by several different types of road signs such as a sign explicitly indicating the road type, such as a highway sign, or a sign indicating that the speed limit is higher than a first threshold. The first threshold may be set such that all roads with a speed limit over the first threshold will be of a type where the lane change assist function is allowed to be activated.

In addition to the plurality of conditions indicating that a lane change assist function may be activated at a current position of the ego vehicle, one or more further conditions indicating that a lane change assist function may not be activated at a current position of the ego vehicle may be evaluated 250.

The one or more further conditions indicating that a lane change assist function may not be activated at a current position of the ego vehicle may be selected from the following conditions:
- the sensor data received in the control unit in the first digital signal from the one or more sensors indicate no detection of a non-traversable separator between the ego vehicle and oncoming traffic,
- the sensor data received in the control unit in the first digital signal from the one or more sensors indicate detection of speed limit sign with speed limit under a second threshold,
- the sensor data received in the control unit in the first digital signal from the one or more sensors indicate detection of tunnel,
- the sensor data received in the control unit in the first digital signal from the one or more sensors indicate detection of toll booth,
- the sensor data received in the control unit in the first digital signal from the one or more sensors indicate detection of construction site, and
- the sensor data received in the control unit in the first digital signal from the one or more sensors indicate detection of highway end sign.

Even if the one or more further conditions are indicated to be based on sensor data, it is to be noted that if evaluation of a same underlying condition of the one or more further conditions indicate that the same underlying condition is met based on historical data or map data, i.e. relating to the other two groups of conditions, this may also be used to identify that lane change assist function may not be activated at a current position of the ego vehicle.

The sensor data received in the control unit from the one or more sensors, e.g. one or more cameras, may indicate detection of a road sign, which road sign indicates a road type on which the lane change assist function may not be activated. This may be identified by several different types of road signs such as a sign explicitly indicating a road type on which the lane change assist function may be activated, a sign indicating end of a road type (highway) on which the lane change assist function may be activated, or a sign indicating that the speed limit is lower than a second threshold. The second threshold may be set such that at least some or all roads with a speed limit under the second threshold will be of a type where the lane change assist function is not allowed to be activated.

The further condition that the sensor data indicates no detection of a non-traversable separator between the ego vehicle and oncoming traffic may be evaluated according to the following. First, lateral coordinates of non-traversable road edges on the right side and the left side of the ego vehicle are determined in the control unit by means of sensor data from the one or more sensors of the ego vehicle. A lateral coordinate of an oncoming vehicle is then determined in the control unit by means of sensor data from the one or more sensors of the ego vehicle. If the lateral coordinate of the oncoming vehicle is within the lateral coordinates of the non-traversable road edges on the right side and the left side of the ego vehicle, it is determined in the control unit that the further condition that the sensor data indicates no detection of a non-traversable separator between the ego vehicle and oncoming traffic is met. In other words, if an oncoming vehicle is identified between the ego vehicle and a non-traversable separator in lateral direction, the condition is evaluated as met. It is to be noted, that if there are more than one lane for traffic in the opposite direction of the direction the ego vehicle is traveling, it must first be established that the oncoming vehicle is traveling in the lane closest in lateral direction from the ego vehicle.

Turning back to FIG. 1*b*, the ego vehicle 1 receives sensor data, e.g. from one or more cameras and/or from one or more radar sensors. From the sensor data, the ego vehicle 1 identifies the lane markers 7*a*, 7*b*, 7*c* and the other vehicle 2*b* travelling in the rightmost lane 3*c*. Based on this, the ego vehicle 1 establishes that there are at least two lanes 3*b*, 3*c* in the same direction 4 as the ego vehicle 1 is traveling in. From the sensor data, the ego vehicle 1 further identifies the non-traversable separator 6 and its lateral position in relation to the ego vehicle 1, and the oncoming vehicle 2*a* and its lateral position in relation to the ego vehicle 1. Furthermore, it is required that it has already been established that the oncoming vehicle 2*a* is traveling in the lane for traffic in the opposite direction 5 of the direction 4 the ego vehicle 1 is traveling closest in lateral direction to the ego vehicle 1. This may be established e.g. by identifying that there is no lane between the opposing lane 3*a* and the leftmost lane 3*b* in which the ego vehicle 1 is travelling. The oncoming vehicle 2*a* is identified as being located between the ego vehicle 1 and the non-traversable separator 6. Hence, this indicates that activation of the lane change assist function may not be activated.

For situations where more than one non-traversable separator is identified, the condition should be met for all non-traversable separators. However, in such a case, the condition may only need to be evaluated for the non-traversable separator closest to the ego vehicle 1 in lateral direction towards the oncoming traffic.

For situation where no non-traversable separator is identified, this directly indicates that activation of the lane change assist function may not be activated.

FIG. 2 comprises some steps that are illustrated in boxes with a solid border and some steps that are illustrated in boxes with a dashed border. The steps that are comprised in boxes with a solid border are operations that are comprised in the broadest example embodiment. The steps that are comprised in boxes with a dashed border are example embodiments that may be comprised in, or a part of, or are further operations that may be taken in addition to the operations of the border example embodiments. The steps do not all need to be performed in order and not all of the operations need to be performed. Furthermore, at least some of the steps may be performed in parallel.

FIG. 3 is a schematic side view illustration of a vehicle 1 (ego vehicle 1 in the following) comprising a control unit in accordance with embodiments of the present disclosure.

The ego vehicle 1 has a sensor system 30 (see FIG. 1) comprising a plurality of sensors 14 (e.g. cameras, LIDARs, RADARs, ultrasound transducers etc.). The sensors 14 are configured to acquire information representative of a surrounding environment of the ego vehicle 1. In more detail, the sensors 14 are suitable for identifying lane markings, traffic signs and the like. The sensor are further suitable for identifying further vehicles to the ego vehicle, both opposing vehicles traveling in a different direction than the ego vehicle 1 and other vehicles travelling in the same direction as the ego vehicle 1. The sensors 14 are further suitable for identifying non-traversable separators and other objects such as toll booths, tunnels, constructions sites etc. used in conditions for determining whether a lane change assist function may be activated or not in a current position of the ego vehicle.

Further, a processor 42 of the control unit 40 is configured to receive sensor data comprising information about the surrounding environment of the ego vehicle 1. It should be appreciated that a sensor interface 11 may also provide the possibility to acquire sensor data directly (not shown) or via dedicated sensor control circuitry 16 in the vehicle 1. A communication/antenna interface 12 may further provide the possibility to receive and transmit data to a remote system 60 in an external network 50 by means of an antenna 18. Moreover, some sensors 14 in the ego vehicle 1 may communicate with the control unit 40 using a local network setup, such as CAN bus, I2C, Ethernet, optical fibres, and so on. A communication/antenna interface 12 may be arranged to communicate with other control functions of the ego vehicle 1 and may thus be seen as control interface also. However, a separate control interface (not shown) may be provided. Local communication within the ego vehicle 1 may also be of a wireless type with protocols such as WiFi, LoRa, Zigbee, Bluetooth, or similar mid/short range technologies.

The ego vehicle 1 also comprises a localization system 20 configured to determine a map position of the ego vehicle 1.

The ego vehicle 1 also typically comprises memory 44 in which historical data and/or map data may be stored. In alternative, the historical data may and/or map data are received form the remote system 60. The historical data are received in the control unit 40 and from the historical data the control unit 40 can identify if the current position of the ego vehicle 1 relates to a position, e.g. relating to a road of a particular road type, for which the historical data indicate that activation of the lane change assist function has been previously allowed.

Similarly, the map data may have been stored locally in memory 44 in the ego vehicle or in the remote system 60. The map data are received in the control unit 40 and from the map data, the control unit 40 can identify if the current position of the ego vehicle 1 relates to a road type for which activation of the lane change assist function is allowed.

The connection from the ego vehicle 1 to the remote system 60 in the external network 50 will typically be via a wireless link via the antenna 18. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The control unit 40 may also be connected to a control system 24 of the ego vehicle 1 and/or a user interface 26 via an interface 28. Via the interface 28, the control unit 40 may send signals to the control system 24 in order to enable or disable activation of the lane change assist function of the ego vehicle 1. Additionally or alternatively, the control unit 40 may send signals via the interface 24 to the user interface 28 to provide information or instructions to a driver of the ego vehicle 1 of whether or not activation of the lane change assist function of the ego vehicle 1 is allowed.

FIG. 4 is a schematic diagram of a control unit 40 in accordance with an embodiment of the present disclosure. The control unit 40 comprises at least one processor 42 and at least one memory 44. The processor 42 is configured to execute instructions 46 stored in the memory 44 causing the central control system 40 to perform a method for automatically controlling a lane change assist function in a vehicle according to the present disclosure and in particular according to the embodiments disclosed in relation to FIG. 2 and FIG. 3.

The processor 42 may for example be manifested as a general-purpose processor, an application specific processor, a circuit containing processing components, a group of distributed processing components, a group of distributed computers configured for processing, a field programmable gate array (FPGA), etc. The processor 42 may be manifested as a microprocessor, microcontroller, programmable digital signal processor or another programmable device. The processor 42 may also, or instead, be manifested as an application-specific integrated circuit (ASIC), a programmable gate array or programmable array logic, a programmable logic device, or a digital signal processor. Where the processor 42 is manifested as a programmable device such as the microprocessor, microcontroller or programmable digital signal processor mentioned above, the processor may further include computer executable code that controls operation of the programmable device.

The control unit 40 may further be or include any number of hardware components for conducting data or signal processing or for executing computer code (instructions 46) stored in memory 44. The memory 44 may be one or more devices for storing data and/or computer code for completing or facilitating the various methods described in the present description. The memory 44 may include volatile memory or non-volatile memory. The memory 44 may include database components, object code components, script components, or any other type of information structure for supporting the various activities of the present description. According to an exemplary embodiment, any distributed or local memory device may be utilized with the systems and methods of this description. According to an exemplary embodiment the memory 44 is communicably connected to the processor 42 (e.g., via a circuit or any other wired, wireless, or network connection) and includes computer code for executing one or more processes described herein.

The memory 44 may be a non-transitory computer-readable storage medium 44 storing one or more programs configured to be executed by one or more processors 42 of the control unit 40, the one or more programs comprising instructions 46 for causing the control unit 40 to perform the method according to the disclosure and in particular according to the embodiments disclosed in relation to FIG. 2.

The control unit 40 of FIG. 4 may either be located in a vehicle or in a system 60 remote from the vehicle connected to the vehicle as disclosed in relation to FIG. 1a, FIG. 1b and FIG. 3 or distributed between them. Thus, even if the control unit 40 of FIG. 4 (and FIG. 3) is disclosed as a single box, this is only for illustrative purposes. The control unit 40 may be distributed between the vehicle and the remote system 60 such that processing in relation to performing the method according to the present disclosure can be made either in the processor 42 of the vehicle, in a processor (not shown) in the external system 60 or partly in both.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a control unit, the one or more programs comprising instructions for performing the method according to any one of the above-discussed embodiments, such as the ones discussed in relation to FIG. 2.

Generally speaking, a computer-readable medium may include any tangible or non-transitory storage media or memory media such as electronic, magnetic, or optical media—e.g., disk or CD/DVD-ROM coupled to computer system via bus. The term "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

It should be understood that parts of the described solution may be implemented either in the vehicle, in a system located external the vehicle, or in a combination of internal and external the vehicle, for instance in a server in communication with the vehicle, a so called cloud solution.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of receiving signals comprising information about a movement and information about a current road scenario may be interchanged based on a specific realization. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A method in a control unit for automatically controlling a lane change assist function in a vehicle, the method comprising:

evaluating, in the control unit, a plurality of conditions indicating that a lane change assist function may be activated at a current position of the vehicle, wherein the plurality of conditions comprises conditions selected from the following groups:

sensor based conditions, which are conditions based on sensor data received in the control unit in a first digital signal from one or more sensors of the vehicle and being related to the current position of the vehicle, historical based conditions, which are conditions based on historical data received in the control unit in a second digital signal from memory and being related to the current position of the vehicle, and map based conditions, which are conditions based on digital map data received in the control unit in a third digital signal from memory and being related to the current position of the vehicle;

providing, in the control unit, a fourth digital signal enabling activation of the lane change assist function in the vehicle at the current position of the vehicle if conditions from at least two different groups of conditions are evaluated as met;

evaluating, in the control unit, one or more further conditions indicating that a lane change assist function may not be activated at the current position of the vehicle, wherein the one or more further conditions comprises that the sensor data received in the control unit in the first digital signal from the one or more sensors indicate no detection of a non-traversable separator between the vehicle and oncoming traffic, wherein the further condition that the sensor data indicates no detection of a non-traversable separator between the vehicle and oncoming traffic, is evaluated by:

determining in the control unit, by means of sensor data from the one or more sensors of the vehicle, lateral coordinates of non-traversable road edges on the right side and the left side of the vehicle, determining in the control unit, by means of sensor data from the one or more sensors of the vehicle, lateral coordinate of an oncoming vehicle, determining, in the control unit, that the further condition that the sensor data indicates no detection of a non-traversable separator between the vehicle and oncoming traffic is met if the lateral coordinate of the oncoming vehicle is within the lateral coordinates of the non-traversable road edges on the right side and the left side of the vehicle; and providing, in the control unit, a seventh digital signal disabling activation of the lane change assist function in the vehicle at the current position of the vehicle if at least one of the one or more further conditions of the further plurality of conditions is met.

2. The method of claim 1, further comprising:

providing, in the control unit, a fifth digital signal enabling activation of the lane change assist function in the vehicle at the current position of the vehicle if at least two conditions from the group of sensor based conditions are evaluated as met, wherein the at least two conditions are based on mutually different algorithms.

3. The method of claim 2, further comprising:

providing, in the control unit, a sixth digital signal disabling activation of the lane change assist function in the vehicle at the current position of the vehicle for all other cases.

4. The method of claim 1, wherein the plurality of conditions are one or more of:

the historical data received in the control unit in the second digital signal from memory indicate that the lane change assist function may be activated at the current position of the vehicle, the digital map data received in the control unit in the third digital signal from memory indicate that that the current position of the vehicle corresponds to a road type on which the lane change assist function may be activated, the sensor data received in the control unit in the first digital signal from the one or more sensors indicate detection of two lanes in a direction the vehicle is travelling and a non-traversable separator to oncoming traffic in relation to the current position of the vehicle, and the sensor data received in the control unit in the first digital signal from the one or more sensors indicate detection of a road sign in relation to the current position of the vehicle, which road sign indicates a road type on which the lane change assist function may be activated.

5. The method of claim 1, wherein the one or more sensors are one or more cameras, ultrasonic sensors, LIDAR sensors or radar sensors.

6. The method of claim 1, wherein the one or more further conditions are selected from the following conditions:

the sensor data received in the control unit in the first digital signal from the one or more sensors indicate detection of speed limit sign with speed limit under a second threshold, the sensor data received in the control unit in the first digital signal from the one or more sensors indicate detection of tunnel, the sensor data received in the control unit in the first digital signal from the one or more sensors indicate detection of toll booth, the sensor data received in the control unit in the first digital signal from the one or more sensors indicate detection of construction site, and the sensor data received in the control unit in the first digital signal from the one or more sensors indicate detection of highway end sign.

7. A non-transitory computer-readable storage medium storing one or more instructions configured to be executed by at least one processor of a control unit, the one or more instructions for causing the control unit to perform a method in the control unit for automatically controlling a lane change assist function in a vehicle, the method comprising:

evaluating, in the control unit, a plurality of conditions indicating that a lane change assist function may be activated at a current position of the vehicle, wherein the plurality of conditions comprises conditions selected from the following groups:

sensor based conditions, which are conditions based on sensor data received in the control unit in a first digital signal from one or more sensors of the vehicle and being related to the current position of the vehicle, historical based conditions, which are conditions based on historical data received in the control unit in a second digital signal from memory and being related to the current position of the vehicle, and map based conditions, which are conditions based on digital map data received in the control unit in a third digital signal from memory and being related to the current position of the vehicle;

providing, in the control unit, a fourth digital signal enabling activation of the lane change assist function in the vehicle at the current position of the vehicle if conditions from at least two different groups of conditions are evaluated as met;

wherein the at least one processor is further configured to execute further instructions stored in the memory causing the control unit to perform the method, further comprising:

evaluating, in the control unit, one or more further conditions indicating that a lane change assist function may not be activated at the current position of the vehicle;

wherein the one or more further conditions comprises that the sensor data received in the control unit in the first digital signal from the one or more sensors indicate no detection of a non-traversable separator between the vehicle and oncoming traffic;

wherein the further condition that the sensor data indicates no detection of a non-traversable separator between the vehicle and oncoming traffic, is evaluated by:

determining in the control unit, by means of sensor data from the one or more sensors of the vehicle, lateral coordinates of non-traversable road edges on the right side and the left side of the vehicle, determining in the control unit, by means of sensor data from the one or more sensors of the vehicle, lateral coordinate of an oncoming vehicle, determining, in the control unit, that the further condition that the sensor data indicates no detection of a non-traversable separator between the vehicle and oncoming traffic is met if the lateral coordinate of the oncoming vehicle is within the lateral coordinates of the non-traversable road edges on the right side and the left side of the vehicle; and providing, in the control unit, a seventh digital signal disabling activation of the lane change assist function in the vehicle at the current position of the vehicle if at least one of the one or more further conditions of the further plurality of conditions is met.

8. A control unit for automatically controlling a lane change assist function in a vehicle at a current position of the vehicle, the control unit comprising:
at least one processor;
at least one memory;
wherein the at least one processor is configured to execute instructions stored in the memory causing the control unit to perform a method comprising:
evaluating, in the control unit, a plurality of conditions indicating that a lane change assist function may be activated at a current position of the vehicle, wherein the plurality of conditions comprises conditions selected from the following groups:
sensor based conditions, which are conditions based on sensor data received in the control unit in a first digital signal from one or more sensors of the vehicle and being related to the current position of the vehicle,
historical based conditions, which are conditions based on historical data received from in the control unit in a second digital signal memory and being related to the current position of the vehicle, and
map based conditions, which are conditions based on digital map data received in the control unit in a third digital signal from memory and being related to the current position of the vehicle;
providing, in the control unit, a fourth digital signal enabling activation of the lane change assist function in the vehicle at the current position of the vehicle if conditions from at least two different groups of conditions are evaluated as met;
wherein the at least one processor is further configured to execute further instructions stored in the memory causing the control unit to perform the method, further comprising:
evaluating, in the control unit, one or more further conditions indicating that a lane change assist function may not be activated at the current position of the vehicle;
wherein the one or more further conditions comprises that the sensor data received in the control unit in the first digital signal from the one or more sensors indicate no detection of a non-traversable separator between the vehicle and oncoming traffic;
wherein the further condition that the sensor data indicates no detection of a non-traversable separator between the vehicle and oncoming traffic, is evaluated by:
determining in the control unit, by means of sensor data from the one or more sensors of the vehicle, lateral coordinates of non-traversable road edges on the right side and the left side of the vehicle,
determining in the control unit, by means of sensor data from the one or more sensors of the vehicle, lateral coordinate of an oncoming vehicle,
determining, in the control unit, that the further condition that the sensor data indicates no detection of a non-traversable separator between the vehicle and oncoming traffic is met if the lateral coordinate of the oncoming vehicle is within the lateral coordinates of the non-traversable road edges on the right side and the left side of the vehicle; and
providing, in the control unit, a seventh digital signal disabling activation of the lane change assist function in the vehicle at the current position of the vehicle if at least one of the one or more further conditions of the further plurality of conditions is met.

9. The control unit of claim 8, wherein the at least one processor is further configured to execute further instructions stored in the memory causing the control unit to perform the method further comprising:
providing, in the control unit, a fifth digital signal enabling activation of the lane change assist function in the vehicle at the current position of the vehicle if at least two conditions from the group of sensor based conditions are evaluated as met, wherein the at least two conditions are based on mutually different algorithms.

10. The control unit of claim 9, wherein the at least one processor is further configured to execute further instructions stored in the memory causing the control unit to perform the method further comprising:
providing, in the control unit, a sixth digital signal disabling activation of the lane change assist function in the vehicle at the current position of the vehicle for all other cases.

11. A vehicle comprising a control unit for automatically controlling a lane change assist function in a vehicle at a current position of the vehicle, the control unit comprising:
at least one processor;
at least one memory;
wherein the at least one processor is configured to execute instructions stored in the memory causing the control unit to perform a method comprising:
evaluating, in the control unit, a plurality of conditions indicating that a lane change assist function may be activated at a current position of the vehicle, wherein the plurality of conditions comprises conditions selected from the following groups:
sensor based conditions, which are conditions based on sensor data received in the control unit in a first digital signal from one or more sensors of the vehicle and being related to the current position of the vehicle,
historical based conditions, which are conditions based on historical data received from in the control unit in a second digital signal memory and being related to the current position of the vehicle, and
map based conditions, which are conditions based on digital map data received in the control unit in a third digital signal from memory and being related to the current position of the vehicle; and
providing, in the control unit, a fourth digital signal enabling activation of the lane change assist function in the vehicle at the current position of the vehicle if conditions from at least two different groups of conditions are evaluated as met;
wherein the at least one processor is further configured to execute further instructions stored in the memory causing the control unit to perform the method, further comprising:
evaluating, in the control unit, one or more further conditions indicating that a lane change assist function may not be activated at the current position of the vehicle;
wherein the one or more further conditions comprises that the sensor data received in the control unit in the first digital signal from the one or more sensors indicate no detection of a non-traversable separator between the vehicle and oncoming traffic;
wherein the further condition that the sensor data indicates no detection of a non-traversable separator between the vehicle and oncoming traffic, is evaluated by:
determining in the control unit, by means of sensor data from the one or more sensors of the vehicle, lateral coordinates of non-traversable road edges on the right side and the left side of the vehicle, determining in the control unit, by means of sensor data from the one or more sensors of the vehicle, lateral coordinate of an oncoming vehicle, determining, in the control unit, that the further condition that the sensor data indicates no detection of a non-traversable separator between the vehicle and oncoming traffic is met if the lateral coordinate of the oncoming vehicle is within the lateral coordinates of the non-traversable road edges on the right side and the left side of the vehicle; and providing, in the control unit, a seventh digital signal disabling activation of the lane change assist function in the vehicle at the current position of the vehicle if at least one of the one or more further conditions of the further plurality of conditions is met.

\* \* \* \* \*